United States Patent
Yamane et al.

(10) Patent No.: US 7,912,635 B2
(45) Date of Patent: Mar. 22, 2011

(54) NAVIGATION SYSTEM

(75) Inventors: Kenichiro Yamane, Ibaraki (JP);
Yoshinori Endo, Ibaraki (JP);
Kimiyoshi Machii, Ibaraki (JP);
Junsuke Fujiwara, Ibaraki (JP)

(73) Assignee: Hitachi, Ltd., Tokyo (JP)

( * ) Notice: Subject to any disclaimer, the term of this patent is extended or adjusted under 35 U.S.C. 154(b) by 1388 days.

(21) Appl. No.: 11/339,630

(22) Filed: Jan. 26, 2006

(65) Prior Publication Data

US 2006/0167616 A1    Jul. 27, 2006

(30) Foreign Application Priority Data

Jan. 27, 2005   (JP) .................................. 2005-019803

(51) Int. Cl.
*G01C 21/30* (2006.01)
(52) U.S. Cl. ....................................................... 701/209
(58) Field of Classification Search .......... 701/200–204, 701/208–213; 340/994, 995.1, 995.13, 995.18, 340/995.19, 995.21, 995.23
See application file for complete search history.

(56) References Cited

U.S. PATENT DOCUMENTS

2004/0249568 A1 *  12/2004  Endo et al. ................... 701/209

FOREIGN PATENT DOCUMENTS

JP          2000-076580          3/2000

* cited by examiner

*Primary Examiner* — Kim T Nguyen
(74) *Attorney, Agent, or Firm* — Crowell & Moring LLP (57) ABSTRACT

The present invention aims to provide a technique that can download traffic information in a more efficient manner, in a navigation system including a traffic information distribution server and a terminal unit. The information distribution server narrows down possible traffic information to be used for processing at the terminal unit before downloading the information to the unit. For example, the traffic information distribution server may include a traffic information obtaining unit for obtaining traffic information pertaining to a link configuring a route or the periphery of the link (e.g., mesh area including the link), and to a predicted running duration of the link; and a sending unit for downloading the obtained traffic information to the terminal unit. The server or the terminal unit may narrow down the object for download.

2 Claims, 7 Drawing Sheets

NAVIGATION SYSTEM

CLAIM OF PRIORITY

The present application claims priority from Japanese application JP 2005-019803 filed on Jan. 27, 2005, the content of which is hereby incorporated by reference into this application.

BACKGROUND OF INVENTION

1. Field of the Invention

The present invention relates to a navigation system, and in particular to a system that uses traffic information to provide route guidance for vehicles.

2. Description of the Related Art

Japanese Patent Application Laid-Open (Kokai) No. 2000-76580 describes a traffic information distribution device for sending predicted traffic information to a user terminal in response to a request from the user. The patent document discloses a technique in which the traffic information distribution device determines and then sends to the user terminal, predicted information to be sent to the user terminal based on the road information sent from the user which traffic status the user is interested in knowing, and on the time which predicted information the user requires.

However, the technique according to the patent document has a disadvantage in that a user terminal download a large amount of information from the traffic information distribution device irrespective of whether the user will actually use the data. In light of this problem, the present invention aim to provide a technique for more efficiently downloading traffic information in a navigation system comprising a server for distributing traffic information and a terminal unit.

SUMMARY OF THE INVENTION

In order to solve the problem, the traffic information distribution server according to the present invention narrows down, as much as possible, traffic information to that to be used in processing at the terminal unit, when downloading the information to the terminal unit.

For example, the traffic information distribution server comprises: as means for narrowing down the download target, a traffic information obtaining unit for obtaining traffic information pertaining to a link configuring a route or to an area including the link (e.g., all the links belonging to a mesh area including the link), and to a predicted running duration of the link; and a sending unit for downloading the obtained information to the terminal unit.

The means for narrowing down the download target may be possessed by the terminal unit. In this case, the download target is narrowed down when a download request is made.

DESCRIPTION OF THE PREFERRED EMBODIMENT

Figure 1:
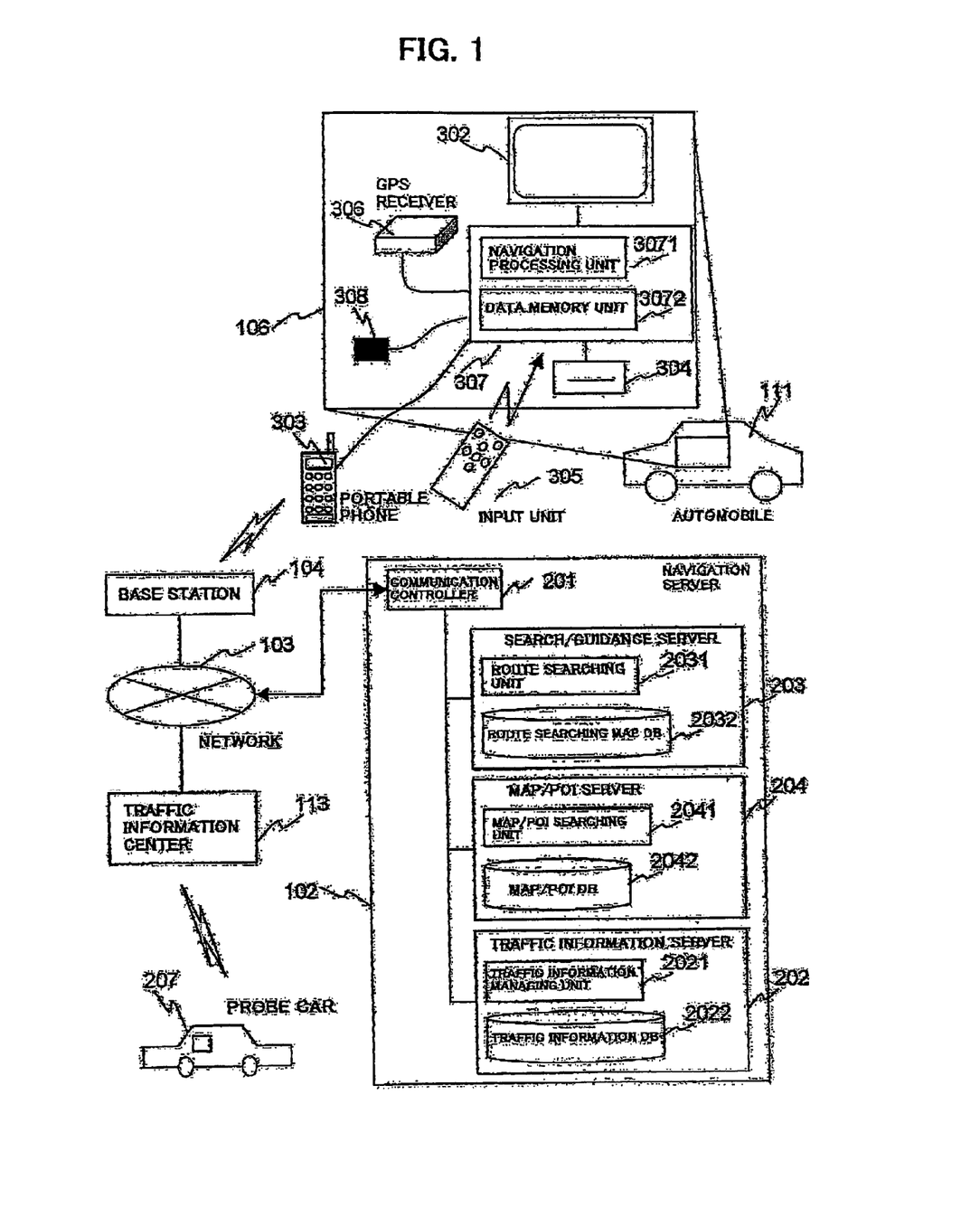
FIG. 1 is a schematic view of a navigation system to which the present embodiment is applied.

Referring to the drawings, an embodiment of the present invention will be described. FIG. 1 is a schematic view of a navigation system to which is applied the present embodiment. As shown in the drawing, the navigation system comprises an on-board terminal 106 mounted on a vehicle 111, a navigation server 102 connected to the on-board terminal 106 via a wireless base station 104 and a network 130, and a traffic information center 113.

The on-board terminal 106 may be an on-board navigation system or an off-board navigation system. The on-board navigation system is a terminal unit that has a memory unit of its own including map data and autonomously performs destination setting and route search without connecting to the navigation server 102. In contrast, the off-board navigation system has no map data and does not autonomously perform route search, but instead requests the navigation server 102 to perform route search and receives the route information searched by the navigation server 102. The off-board navigation system also uses map data received from the navigation server 102 to display a map, for example. The following description will be made on both the on-board and off-board navigation systems, with additional description for a different construction and process.

The on-board terminal 106 comprises a display unit 302, a GPS (Global Positioning System) receiver 306, a main unit 307, an external memory 304, a portable phone 303, an input unit 305, and a microphone 308, for example.

The main unit 307 is a central unit which performs various processes, and includes a CPU, a memory, a power source, and a graphical displaying device, for example. The main unit 307 comprises as its functional construction, a navigation processing unit 3071 and a data memory unit 3072 as shown in the drawing. The navigation processing unit 3071 obtains the current location from the output of the GPS receiver 306, and also displays various pieces of information on the display unit 302 according to a request from the input unit 305. Further, the navigation processing unit 3071 sends/receives information to/from the navigation server 102 via the portable phone 303. In the case of the on-board navigation system, the navigation processing unit 3071 searches the route from the starting location to the destination by using, for example, the Dykstra method, and the searched route is used to perform route guidance.

The data memory unit 3072 stores route information from the starting location to the destination and traffic information received from the navigation server 102 according to an instruction of the navigation processing unit 3071.

The functions of these processing portions can be constructed by the CPU implementing a program loaded in the memory.

The external memory unit 304 is a unit for, for example, storing reception data from the navigation server 102 and loading information downloaded in the past into the on-board terminal 106. In the case of the on-board navigation system, the external memory unit 304 stores map data to be used for route search and display. The map data contains, for each of the mesh areas partitioned on the map area (areas partitioned by predetermined latitude and longitude), link data such as location information, link cost (e.g., link traveling time), and road shape, with regard to the link configuring the road contained in the mesh areas. The external memory unit 304 is constructed by, for example, a memory card, a HDD, DVD-RAM, DVD-RW, and DVD+RW. The external memory unit 304 may download in advance maps of the starting location and its peripherals from the navigation server 102. This can save the user from the trouble of downloading the maps from the navigation server 102 at the initial phase.

Although the above-mentioned construction uses the portable phone 303 for communication with the navigation server 102, a PHS (Personal Handyphone System), other communication equipment such as a communication adapter for wireless LAN (Local Area Network) and satellite communication, a PDA (Personal Digital Assistance), and a modem integrated with the main unit 307 may also be used. Instead of the GPS receiver 306, location measurement information from a satellite other than the GPS, as well as a location identifying service using PHS and portable phone may also be used.

The traffic information center 113 collects data such as traffic information (e.g., traffic amount and occupation rate) collected by sensors placed on roads, or locations and speed information, for example, uploaded form a probe car 207 running on the roads. The collected traffic information is sent to a traffic information server 202 of the navigation server 102. The traffic information to be sent includes, for example, traffic jam, traveling time, restriction, obstacle, parking lot, service area (SA)/parking area (PA), and character message (such as emergency information), in addition to the information measured by the sensors.

The navigation server 102 comprises a communication controller 201, a traffic information server 202, a search/guidance server 203, and a map/POI (Point of Interest) server 204.

The communication controller 201 intermediates between the navigation server 102 and the on-board terminal 106 or the traffic information center 113, via the network 103. For example, if the network 103 is the WWW, CGI (Common Gate Interface) can be used by using the communication controller 201. The communication controller 201 receives data on a requested service sent from the on-board terminal 106 via the network 103. Then, the communication controller 201 performs user authentication and sends the received data to at least one of the map/POI server 204, the search/guidance server 203, and the traffic information server 202 depending on the requested service.

The traffic information server 202 is a server for processing traffic information, and comprises a traffic information managing unit 2021 and a traffic information DB 2022. The traffic information managing unit 2021 receives traffic information sent from the traffic information center 113 via the network 103 and then stores the information to the traffic information DB 2022. Based on the information, the traffic information managing unit 2021 generates predicted traffic information using a method such as below.

(1) Method by categorizing traffic information stored in the traffic information DB 2022 by day type such as weekday of holiday for each link, obtaining an average value for traveling time or traffic jam data in the same duration for each category, and then applying the value to the predicted value of the target duration.

(2) Time series data extrapolation method in which a technique such as autoregression, Kalman filter, and neural network is used to obtain a curve (straight line) to extrapolate into the present time series data, so as to predict a traffic condition in the near future.

(3) Method by comparing time series data between past and present dates to make a prediction by using data of a similar date.

The traffic information managing unit 2021 distributes traffic information on the periphery of the current or arbitrary location or the route, depending on the request from the on-board terminal 106. The traffic information managing unit 2021 also searches traffic information on or on the periphery of the route via the traffic information DB 2022 based on the route searching result by a route searching unit 2031 (to be described later), and then distributes the information to the on-board terminal 106.

When the on-board terminal 106 is the off-board navigation system, the search/guidance server 203 performs route search in place of the on-board terminal 106, and uses the search result to generate guidance information. The search/guidance server 203 comprises a route searching unit 2031 and a route searching map DB 2032. The route searching map DB 2032 contains link data that includes location information, link cost (e.g., link traveling time), and road shape with regard to the link configuring the road contained in each of the mesh areas compartmenting the map area. The route searching map DB 2032 also stores, for example, spot information such as restaurants and convenient stores.

The route searching unit 2031 performs route search. More specifically, the route searching unit 2031 performs route search by referring to information in the route searching map DB 2031 and the traffic information DB 2022 based on information on the stating point, destination, search conditions, and other optional data. Then, the route searching unit 2031 obtains sequence of route coordinate points or route link sequence of the searched route, and further creates guidance information that corresponds to the route. The route searching unit 2031 also sends the route search result to the traffic information server 202.

The map/POI server 204 sends maps for display or POI information to the on-board terminal 106 when the on-board terminal 106 is the off-board navigation system. The map/POI server 204 comprises a map/POI searching unit 2041 and a map/POI DB 2042. The map/POI DB 2042 stores, for example, map data and location information on specific spots. The map/POI searching unit 2041 refers to the map/POI DB 2042 in response to a request from the on-board terminal 106 to download the POI information and a map, and then cuts out and sends the POI or map to the on-board terminal 106 via the communication controller 201. The POI information includes names, longitude and latitude of facilities such as restaurants, convenient stores and banks.

(Operation of On-Board Terminal)

Figure 2:
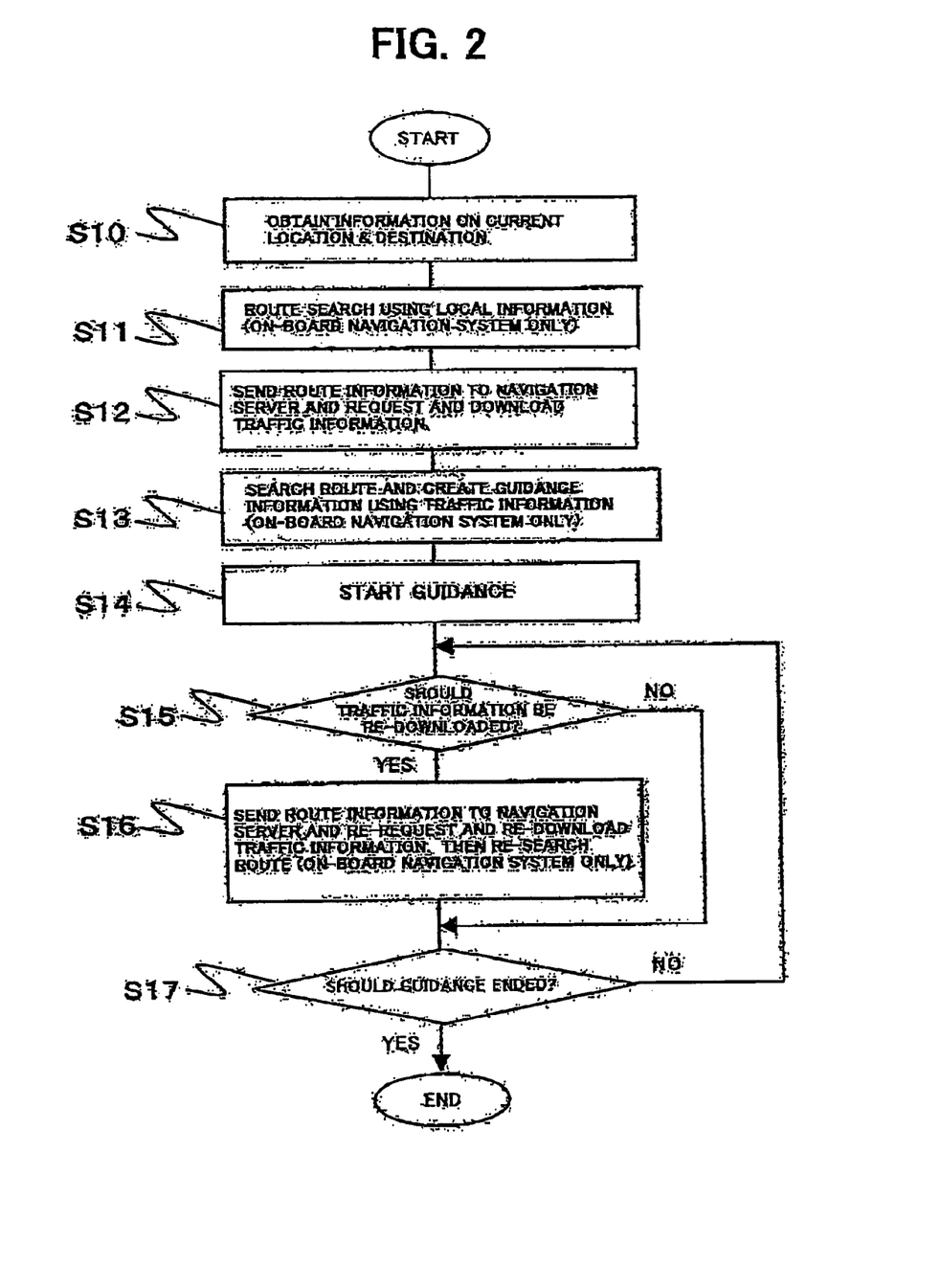
FIG. 2 is a flowchart for processes performed by an on-board terminal in downloading traffic information up to a destination.

Next, the operation of the navigation system according to the present invention will be described. FIG. 2 is a flowchart for operations of the on-board terminal 106 which is the on-board navigation system. In the flowchart, the on-board terminal 106 accesses to the navigation server 102 to download traffic information up to the destination. Although when the on-board terminal 106 is the off-board navigation system, the operation is partially different, description of this part will be added accordingly.

First, in Step 10, the navigation processing unit 3071 of the on-board terminal 106 obtains the starting location and the destination from the user via the input unit 305. The navigation processing unit 3071 also obtains an en-route location if it is input from the unit 305.

In Step 11, the navigation processing unit 3071 performs route search using the link cost contained in the map data of the external memory unit 304, based on the obtained information on the starting location, destination, and route information. Then, on the route searched, the navigation processing unit 3071 obtains route information including a sequence of configuration links or sequence of coordinate points of the route, for example.

When the on-board terminal 106 is the off-board navigation system, which can not perform route search by itself, route search is omitted and the process proceeds to the next step.

In Step 12, the navigation processing unit 3071 sends to the navigation server 102 a request to download traffic information along with a user Id, navigation system type information (of being the on-board navigation system), and route information obtained in Step 11. The navigation processing unit 3071 receives traffic information in predetermined duration on the periphery of the route, which was sent from the navigation server 102 in response to the request.

When the on-board terminal 106 is the off-board navigation system, the navigation processing unit 3071 sends information on user ID, navigation system type information (of being the on-board navigation system), starting location and destination, or en-route location, to the navigation server 102. The navigation processing unit 3071 also sends to the navigation server 102 a route search request, as well as download request for the search results of route information, route guidance, and other traffic information. The navigation processing unit 3071 then receives route information, route guidance, and traffic information in predetermined duration around the route which were sent from the navigation server 102 in response the request.

Then in Step 13, the navigation processing unit 3071 reperform route search using the traffic information received from the navigation server 102 in Step 12. The received traffic information includes a link cost relating to a predetermined link. Therefore, for a link whose link cost is included in the received traffic information, the link cost is used to perform route search. For other links, a link cost contained in the map data in the external memory unit 304 is used to perform route search. When the received traffic information includes the moving speed of the link, a route search may be performed using a link cost obtained from the speed and a link length contained in the map data.

After performing route search, the navigation processing unit 3071 generates guidance information on the searched route. The guidance information is used in route guidance. Thus, the guidance information is generated to include, for example, a guiding point such as a diverging point and indications on turning left or right so that the user can run along the route.

When the on-board terminal 106 is the off-board navigation system, the above-described processes for the on-board navigation system are omitted and the process proceeds to the next process, because Step 12 has already received route information, guidance information on the route, and other relevant traffic information (including traffic jam information, for example) from the navigation server 102 (Step 13).

In step 14, the navigation processing unit 3071 starts performing route guidance based on the received route information, guidance information, and traffic information. In particular, the navigation processing unit 3071 displays on the map of the display unit 302 the route from the starting location to the destination. The navigation processing unit 3071 also displays information indicating to turn left or right at a guiding point such as a junction by using the guidance information, or displays, for example, information on traffic jam on the periphery of the route by using the traffic information.

Next, in Step 15, the navigation processing unit 3071 determines whether or not to redownload traffic information during the route guidance. For example, the navigation processing unit 3071 determines to perform the redownload at certain time intervals (of 15 minutes, for example) using a clock function (or the GPS receiver 306) of the on-board terminal 106. Other determining methods will be discussed later.

If it is determined not to perform the download (No in Step 15), the navigation processing unit 3071 proceeds to Step 17.

If it is determined to perform the download (Yes in Step 15), then following processes are conducted in Step 16. The navigation processing unit 3071 downloads traffic information as in Step 12. That is, a request to download traffic information is sent to the navigation server 102 along with user ID, navigation system type information, route information on the route now in use for route guidance (such as link sequence and sequence of route coordinate points). The navigation processing unit 3071 receives traffic information including a link cost in predetermined duration on the periphery of the route which was sent from the navigation server 102 in response to the request. Then, the navigation processing unit 3071 uses the received traffic information to reperform route search as in Step 13, and then restart the guidance using the route searched again.

When the on-board terminal 106 is the off-board navigation system, the navigation processing unit 3071 sends to the navigation server 102 a request to download route information on the route now in use for route guidance, guidance information, and traffic information, along with user ID, navigation system type information, location information on current location, destination, or en-route location. Then, with regard to the route searched by and sent form the navigation server 102 in response to the request, the navigation processing unit 3071 receives route information, guidance information, and traffic information of predetermined duration on the periphery of the route which were sent from the navigation server 102 in response to the request. When a download request is made only for traffic information such as traffic jam information because there is no need to change the route, route and guidance information need not be requested. This reduces the amount and time for communications.

Next, in Step 17, the navigation processing unit 3071 determines whether or not to end the route guidance. The conditions for ending the route guidance include, for example, when the current location is determined to be in the vicinity of the destination and when the user forcibly end the guidance, for example. To end the guidance, end the series of processes. When the guidance does now end, proceed to Step 15 while continuing the route guidance, and then repeat Steps 15 to 17.

The above has been the description of the on-board terminal 106.

(Navigation Server Operation)

Figure 3:
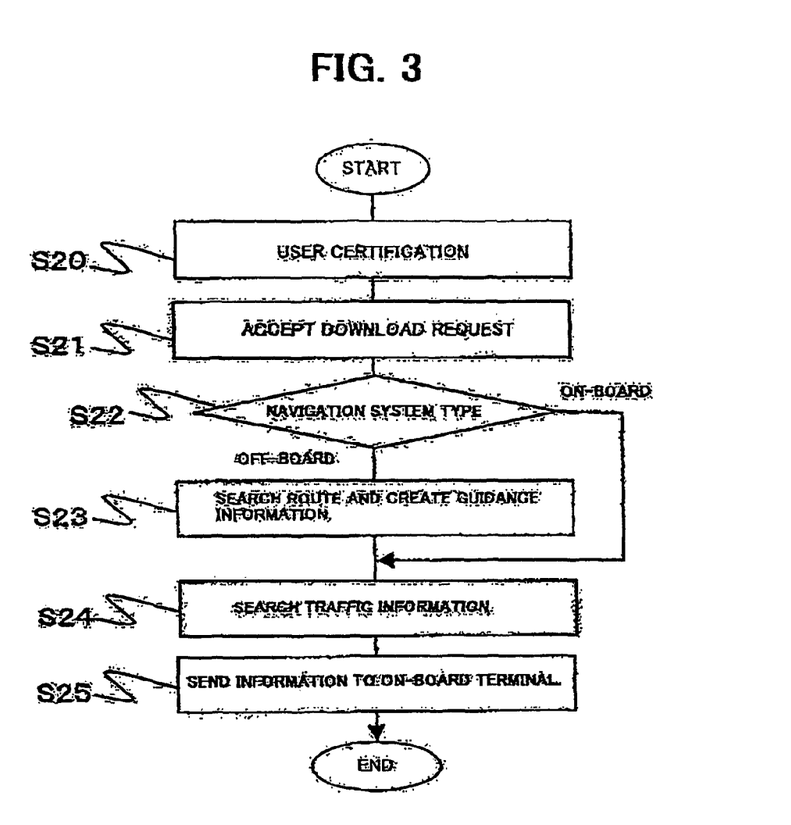
FIG. 3 is a flowchart for processes performed by a navigation server in downloading traffic information up to a destination.

Next, the operation of the navigation server 102 will be discussed. FIG. 3 is a flowchart for processes performed by the navigation server 102. The flow starts when the communication controller 201 receives the information sent form the on-board terminal 106 in the process in Step 12.

First in Step 20, the communication controller 201 performs user certification by referring, for example, the user ID and password contained in the information sent from the on-board terminal 106 with pre-registered information. If the certification succeeds, then the communication controller 201 proceeds to the next step. If not, the communication controller 201 sends information notifying the certification failure to the on-board terminal 106 and ends the process.

Next, in Step 21, if the user certification is successful, the communication controller 201 receives a download request form the on-board terminal 10.

In Step 22, the communication controller 201 determines whether the on-board terminal 106 is an on-board or off-board navigation system based on the navigation system type information received from the on-board terminal 106. In the case of the on-board navigation system, the process proceeds to Step 24.

In the case of the off-board navigation system, the communication controller 201 instructs the route searching unit 2031 to perform route search. Then in Step 23, on receiving the instruction, the route searching unit 2031 performs route search using location information on the current location, destination, and en-route location contained in the information sent from the on-board terminal 106. The route search is conducted with the same method as in Steps 11 to 13 in the case of the on-board navigation system as discussed above. That is, the route searching unit 2031 first searches a route with the Dykstra method using the link cost of the route searching map DB 2032, and then sends the route information on the searched route to the traffic information managing unit 2021. The traffic information managing unit 2021 sends to the route searching unit 2031, the link cost for a link (specially, a link in the mesh including the link) in the periphery of the link configuring the route specified by the route information. The route searching unit 2031 reperforms route search using the link cost received from the traffic information managing unit 2021. That is, for a link whose link cost is included in the received traffic information, the link cost is used for route search. For other links, a link cost contained in the route searching map DB is used to perform route search. After the route search is finally complete, the route searching unit 2031 generates guidance information on the searched route, in the same manner with the process in the above-mentioned Step 13 (for the on-board navigation system).

Then in Step 24, the traffic information managing unit 2021 obtains information to be sent to the on-board terminal 106 from the traffic information DB 2022. The method for obtaining the information will be discussed later.

In Step 25, the traffic information managing unit 2021 stores the information obtained in Step 24 into a predetermined format, sends the information to the on-board terminal 106 via the communication controller 201, and then ends the process. In this manner, the navigation server 102 cares out the processes of the above-described flow, every time it receives a request for downloading information, from the on-board terminal 106.

Next will be discussed the method in which the traffic information managing unit 2021 obtains information to be sent to the on-board terminal 106 from the traffic information DB 2022 in Step 24. First will be described the request for downloading a traffic information made in the process in Step 12.

First, the traffic information managing unit 2021 determines the range of traffic information to be obtained. Herein, the concept of time-space cell will be used for description. The traffic information is partitioned by a link or mesh area, and duration, and is considered to belong to any time-space cell.

Figure 4:
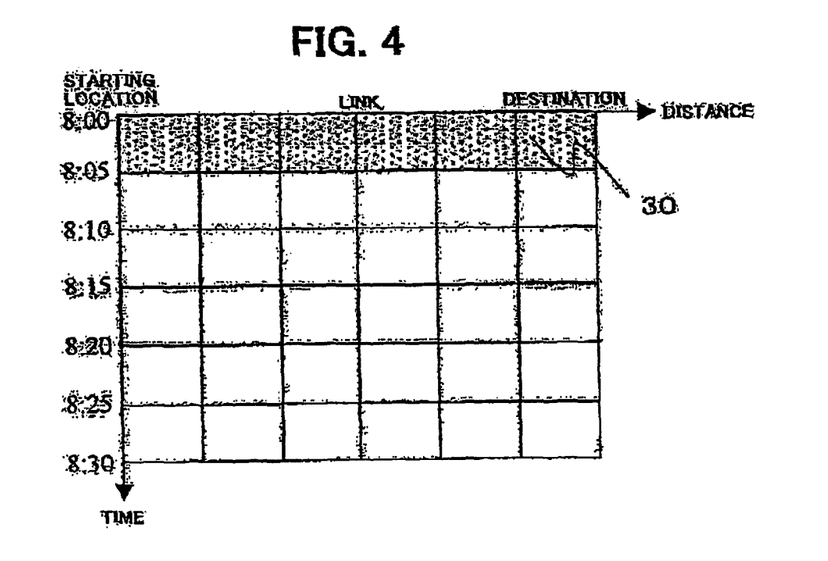
FIG. 4 is a drawing to show an exemplary time-space cells for traffic information according to a route link.

FIG. 4 shows time-space cells to which belongs the traffic information (such as average traveling time and speed) pertaining to a link configuring the route from the starting location to the destination. In the time-space cell, traffic information such as the average speed is constant. The lateral and vertical axes respectively show a link as a managing unit for traffic information, and duration (of 5 minutes in the exemplary drawing). Instead of the link, the lateral axis may be a mesh (areas partitioned by latitude and longitude in a predetermined interval) to which the link belongs.

The following description will be made for the case in which the vehicle starts the stating location at 8:00, and the lateral and vertical axes are the link and time duration in 5 minute intervals, respectively.

In this example, the range of traffic information obtained by the traffic information managing unit 2021 may be considered to relate, for example, to a link configuring the route and may be the duration to which the starting time belongs.

In the example of FIG. 4, if the present location is the starting location, the time when a download request is made (hereinafter referred to as "DL request time") is 8:00-8:05, and therefore it suffices to obtain traffic information belonging to the hatched time-space cells 30. Traffic information thus obtained would be configured by the latest traffic information on the route link at the current time.

The traffic information thus obtained is effective as long as there is not a major exchange in the traffic status by the time the vehicle arrives at the destination. However, if the traffic status changes as the passage of time, for example, in the time zone when the traffic amount changes, the difference between the traffic information and the actual traffic status becomes large.

Figure 5:
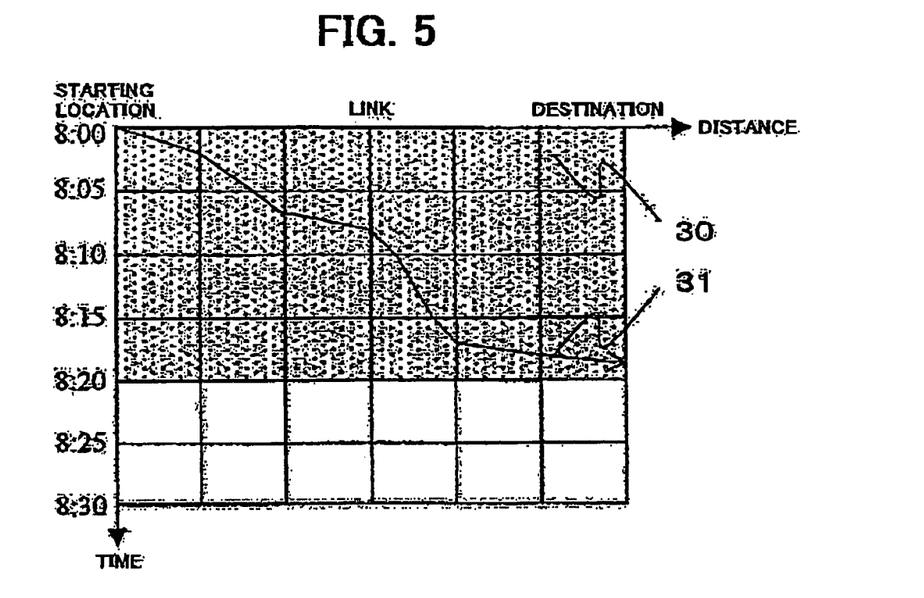
FIG. 5 is a drawing to illustrate an exemplary method for determining the range for predicted traffic information to be sent.

Then can be conceived a method to include predicted traffic information or traffic information in the future into the range of traffic information to be obtained. FIG. 5 shows a method for selecting time-space cells in this case. In the drawing, the traffic information belonging to the time-space cells from 8:05 to 8:20 is predicted traffic information. The reference numeral 31 designates a predicted running trajectory of the vehicle. The trajectory is obtained by adding to the starting time, the link traveling time in the time-space cells corresponding to the arrival time to each of the links.

In this case, time-space cells may be selected for all the links configuring the route, and for all the time-space cells from the DL request time (8:00) to the predicted arrival time to the destination (8:15-8:20), as shown in the drawing. This allows the on-board terminal 106 to also obtain predicted traffic information and to handle the situation in which the current traffic status has changed.

However, if all the traffic information in such a range is to be downloaded, then traffic information which is not actually necessary is also sent (downloaded) to the on-board terminal 106, and thereby the data transmission amount and cost are increased.

Therefore, the present embodiment narrows down the range of traffic information to be sent to the on-board terminal 106 in the following manner. That is, the range of obtaining the traffic information is narrowed down to the duration which relates to the link configuring the route, and which is within the predicted running time in the link. The traffic information in this range is obtained from the traffic information DB 2022.

Figure 6:
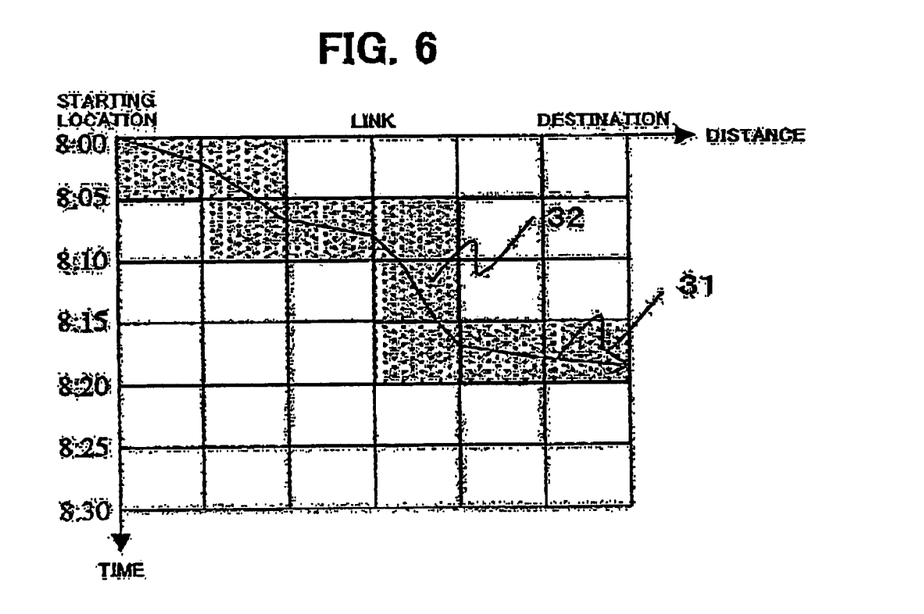
FIG. 6 is a drawing to illustrate another exemplary method for determining the range for predicted traffic information to be sent.
Figure 10A:
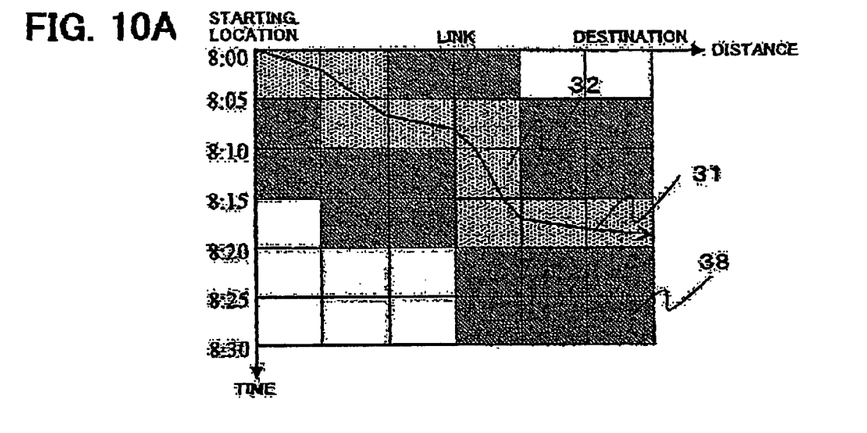
FIG. 10A is a drawing to illustrate a method for extracting time-space cells.
Figure 10B:
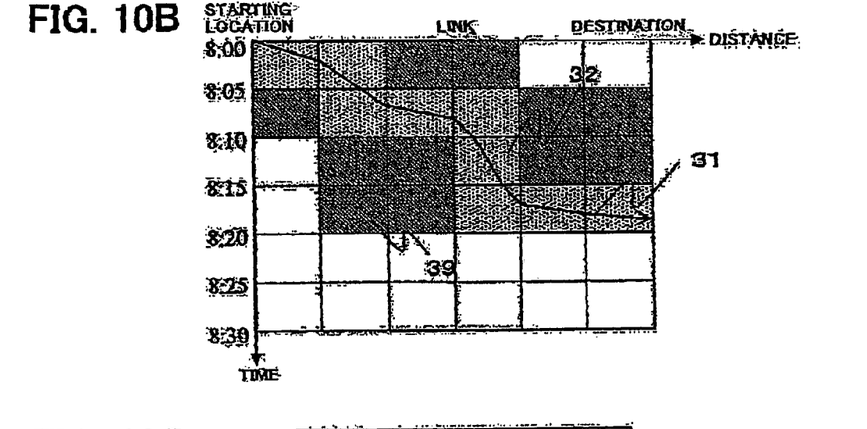
FIG. 10B is a drawing to illustrate a method for extracting time-space cells.
Figure 10C:
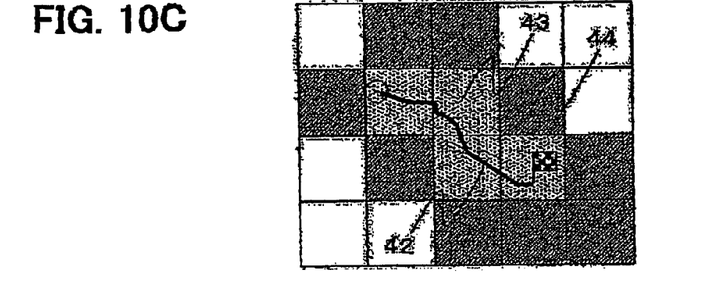
FIG. 10C is a drawing to illustrate a method for extracting time-space cells.

FIG. 6 is a drawing to show a method for obtaining the time-space cells in this case. As shown in the drawing, only time cells including the predicted running trajectory 31 are extracted, thus allowing downloading only the necessary minimum traffic information. Also, assuming that the predicted running trajectory 31 has a certain error, not only extracting the time-space cells 32 to which the trajectory belongs but also time-space cells before and after the extracted cells may be included and extracted. For example, if the time error is set to 10 minutes, then time-space cells 38 within 10 minutes (2 cells) before and after the extracted time-space cells 32 in the vertical axis are newly extracted as shown in FIG. 10A. Time-space cells in the past are not extracted. In contrast, if the space error is set to 2 cells, then time-space cells 39 within 2 links (2 cells) before and after the extracted time-space cells 32 in the lateral axis will be newly extracted as shown in FIG. 10B. Cells in the links existing in the upstream from the starting location and in downstream from the destination are not extracted. Here, in the case where meshes are in the lateral axis instead of the links and the space error is set to 1 mesh, time-space cells of the meshes 44 around the meshes 43 including the running route 42 (in the same duration) may be newly extracted, in addition to the extracted time-space cells 32 in mesh unit as shown in FIG. 10C. When both the time and space errors are taken into consideration, the newly extracted time-space cells 38, 39 may be extracted by logical sum (OR).

After thus extracting the time-space cells, the traffic information managing unit 2021 obtains traffic information belonging to the cells from the traffic information DB 2022.

If a plurality of time-space cells are extracted from the same link, then a representative value may be set to the link by, for example, obtaining an average value among the pieces of traffic information (e.g., traveling time and moving speed) each belonging to a cell. Setting the representative value allows the on-board terminal 106 to handle the predicted traffic information in the same manner as the current traffic information without performing any particular process, and therefore is efficient. In FIGS. 4 to 6, if the lateral axis is provided in meshes and if a plurality of links exist in the same mesh, then a plurality of time-space cells are extracted corresponding thereto. In this case, an average duration should be calculated for the route links in the mesh, and time-space cells be extracted pertaining to the average duration for all the links belonging to the mesh.

Next will be discussed a method for obtaining information from the traffic information DB 2022 of the traffic information managing unit 2021 when the download request is made by the process of Step 16.

Figure 7:
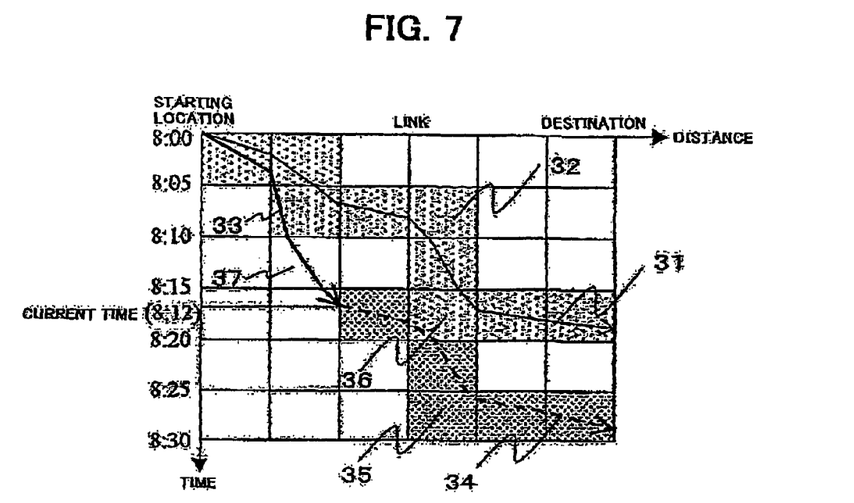
FIG. 7 is a drawing to illustrate yet another exemplary method for determining the range for predicted traffic information to be sent.

In FIG. 7, the hatched time-space cells 32 are the time-space cells belonging to the traffic information downloaded to the on-board terminal 106 in response to the previous DL request. The traffic information managing unit 2021 memorizes this fact. When the on-board terminal 106 makes a download-request at the present time point (8:12), the traffic information DB 2022 retains the latest traffic information at this time point. The traffic information managing unit 2021 uses the predicted traffic information to calculate a new predicted running trajectory 34 so as to extract new time-space cells 35 to which the predicted running trajectory 34 belongs.

Traffic information which is already downloaded such as that for the time-space cells 36 may not be downloaded this time in order to reduce the information transmission amount.

It is to be noted that there may be a difference in data between traffic information predicted previously and this time due to the different prediction times. Therefore, if the previous prediction time (8:00-8:05) is older than the current prediction time (8:10-8:15) by more than a predetermined value (e.g., 20 minutes), or if the previous and present data have a difference by more than a predetermined amount, then the traffic information managing unit 2021 may download the data predicted this time.

Heretofore, the method for the traffic information managing unit 2021 to obtain traffic information in Step 24 has been described.

Although in the above description, the navigation server 102 play the main part to narrow down the traffic information to be transmitted, the on-board terminal 106 may play the main role therefore. That is, the navigation processing unit 3071 in the on-board terminal 106 sends a download request to the navigation server after narrowing down the downloading target in advance. It is considered at this time that the external memory unit 304 or the data memory unit 3072 of the on-board terminal 106 retains a statistical traffic information DB. The statistical traffic information DB has been averaged for each link and duration by using actual traffic information (average traveling time and speed) stored for a certain time period. In other words, the on-board terminal 106 is considered to retain statistical traffic information for all of the time-space cells. The statistical traffic information DB contains, besides the average traveling time and speed, a statistical amount thereof such as dispersion (or standard deviation).

In FIG. 7, it is considered that the current time is 8:12 and that the predicted traffic information for the time-space cell depicted by the reference numeral 32 has been previously downloaded at 8:00. Although newly calculating the predicted running trajectory 34 from the current location up to the destination requires predicted traffic information, predicted traffic information for the time-space cell 32 alone is not enough. In this case, instead of the lacking predicted traffic information, average traveling time and speed contained in the statistical traffic information DB are applied. The navigation processing unit 3071 calculates the predicted running trajectory 34 by using previously downloaded predicted truer information and statistical traffic information. Then, the navigation processing unit 3071 makes a request to download only the traffic information on the time-space cells 35 including the predicted running trajectory 34. In response to this request, the traffic information managing unit 2021 of the navigation server 102 obtains from the traffic information DB 2022, predicted traffic information on the time-space cell 35 to be downloaded to the on-board terminal 106, and then sends the information to the on-board terminal 106.

The navigation processing unit 3071 of the on-board terminal 106 may narrow down the time-space cells to be downloaded from the obtained time-space cells 35 depending on the dispersion of the statistical traffic information. That is, because smaller and larger dispersions respectively mean higher and lower reliabilities of the statistical traffic information, only time-space cells having larger dispersion than a predetermined value may be downloaded.

Although in the description above, the concept of the time-space cell has been used, no limitation is placed on the way for determining the range of traffic information to be downloaded and on the data construction of the traffic information in the traffic information DB 2022 as long as they can narrow down traffic information to be downloaded according to the purpose of the present embodiment.

Traffic information may be downloaded for each link or mesh.

Predicted traffic information may be stored in the traffic information DB 2022 in advance, or the range of traffic information to be downloaded to the on-board terminal 106 may be determined before preparing predicted traffic information within the range.

Although an embodiment of the present invention has been described heretofore, various modifications may be made in the invention without departing from the scope of the present invention.

Figure 8:
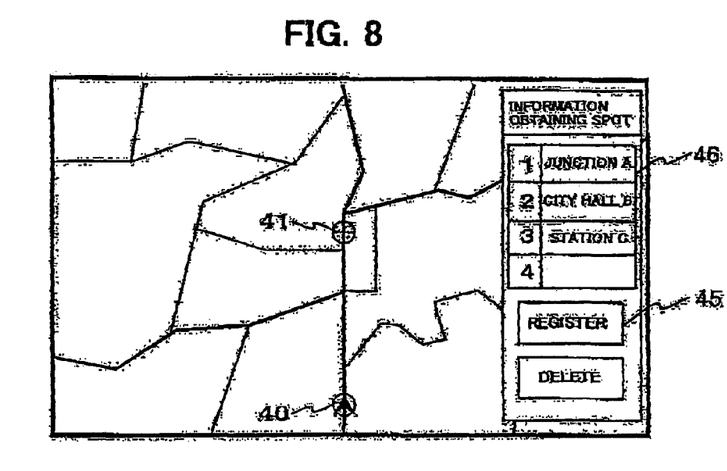
FIG. 8 is a drawing to show an exemplary screen display then the user uses the HMI function to set a location about which traffic information should be downloaded.

For example, the determination in Step 15 as to whether or not to redownload traffic information may be carried out in the following manner. The navigation processing unit 3071 may determine to perform the redownload if, for example, the current location obtained from the GPS is near a predetermined spot for obtaining information. This predetermined spot for downloading information may be prestored in the data memory unit 3072 in the on-board terminal 106, or may be freely added and saved by the user by using the HMI (Human Machine Interface) function on the map screen displayed on the display unit 302. FIG. 8 shows an example of the display screen in this case. In FIG. 8, the spot for obtaining information can be specified using a cursor 41 and registered using the register button 45. The registered spot for obtaining information is displayed as the reference numeral 46.

The determination to perform the redownload may be made, if predicted and actual running times to a specified spot on the route have a disparity by a predetermined (e.g., 10 minutes) or more value.

The determination to perform the redownload may also be made, if the trajectory is recalculated using the statistical traffic information when the predicted running trajectory 31 shown in FIGS. 5-7 has a low accuracy, and still the disparity exists by a predetermined or more value.

The redownload may also be made, if the current vehicle location on the actual running trajectory 33 belongs to a time-space cell which has not previously downloaded and obtained predicted traffic information, such as a time-space cell 37 belonging to 8:10-8:15.

The redownload may also be made, if time-space cells which have downloaded traffic information have averagely large dispersion (or standard deviation) of the statistical traffic information, and if the predicting time of the downloaded traffic information is older than the current time by a predetermined or more value, and therefore a prediction error is very likely to occur.

Figure 9:
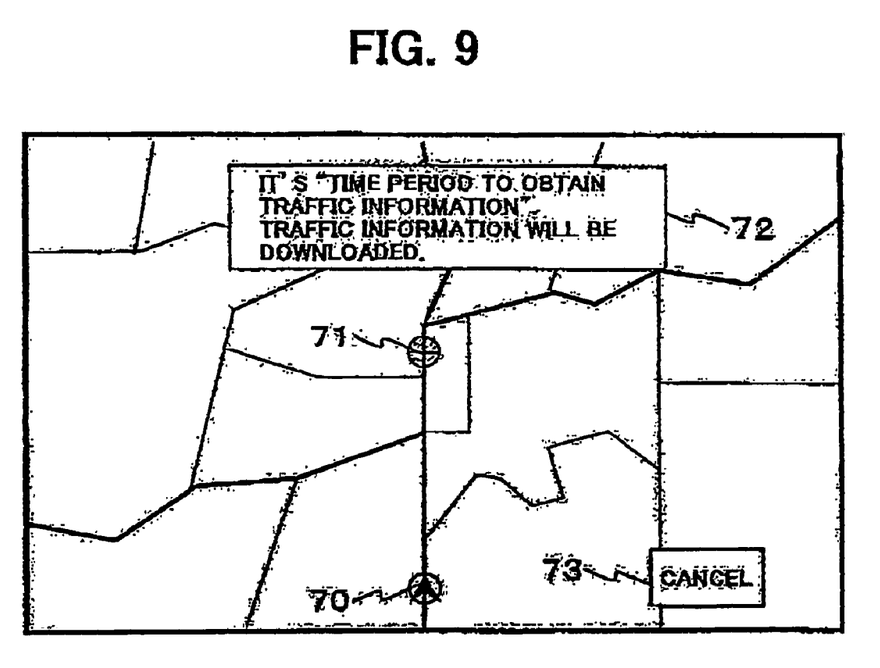
FIG. 9 is a drawing to show an exemplary screen display notifying the user that download is about to start.

The navigation processing unit 3071 may start redownloading traffic information when a conditions for the redownload permits, while displaying on the display unit 302 as shown in FIG. 9 or audibly noticing the user of a message 72 of the condition matching. In FIG. 9, reference numerals 70, 71, 72 and 73 respectively designate the current location of the vehicle, a preregistered spot for obtaining information, an area for displaying a matched condition for performing the redownload, and a (touch panel) button for canceling the download. Although this example takes an exemplary display in which the matching condition is preset time period for obtaining information, other conditions may also be displayed in a similar manner, with the matching condition displayed in a distinct manner from other characters for easy recognition for the user. Additional audible reading of the displayed content will further facilitate the recognition. Further, automatically starting download following the notification of the matching condition to the user will eliminate the user operation thus contributing to safe driving. These will allow the user to easily know the reason for download. Also, the navigation processing unit 3071 may cancel a download when the user makes a request to cancel redownload via the input unit 305 by, for example, pressing the cancel button 73 on the display.

As has been discussed above, the present embodiment can appropriately reduce the information amount in downloading information from the navigation server to the on-board terminal.

What is claimed is:

1. A terminal unit comprising:
   a navigation processing unit;
   a memory unit;
   the navigation processing unit further including,
   a route search unit for searching a route from a starting location to a destination by using traffic information stored in the memory unit, the traffic information including a link configuring a route or an area including the link and a link cost, the area being a mesh area partitioned by a predetermined latitude and longitude, and
   a download request unit for requesting a traffic information distribution server for distributing traffic information to download traffic information relating to a link belonging to the searched route or to an area including the searched route,
   wherein the route search unit reperforms route search by using the link cost included in the downloaded traffic information when the link cost for the link is included in the downloaded traffic information, and using the link cost stored in the memory unit of the route search unit when the link cost for the link is not included in the downloaded traffic information;
   and wherein the download unit makes a request for downloading:
   a) traffic information with respect to all sub-links included within a predicted running duration of the link, and at least one of:
   b) traffic information of expanding mesh areas, by including a plurality of mesh areas adjacent to the mesh area along the route within the predicted running duration, and
   c) traffic information of an expanding period of time duration, by adding a predetermined time to the predicted running duration in the mesh area that includes the link.

2. A terminal unit as claimed in claim 1,
   wherein the memory unit stores statistical traffic information created by statistical processing, and
   the download request unit makes a request for downloading traffic information relating to the link that configures the route, dispersion of statistical traffic information for the predicted running duration of the link that is larger than a predetermined value, and traffic information relating to the predicted running duration of the link or of a sub-link belonging to an area including the link.

* * * * *